June 29, 1965     E. PLUMAT     3,192,025
COOLING PROCESS AND DEVICE FOR THE DRAWING OF GLASS
Filed March 17, 1961     2 Sheets-Sheet 1
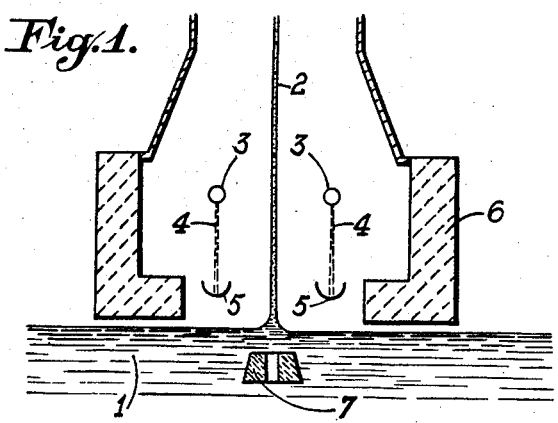
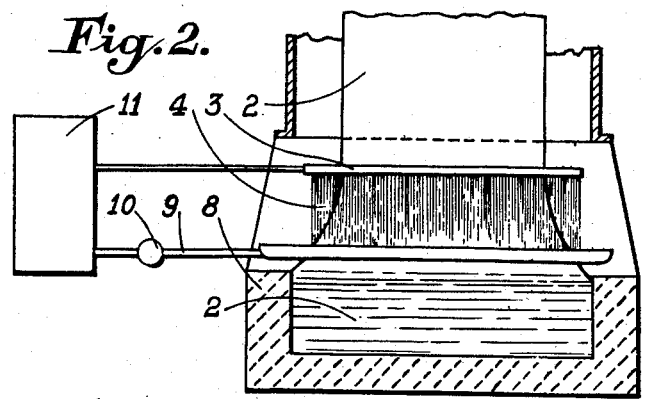
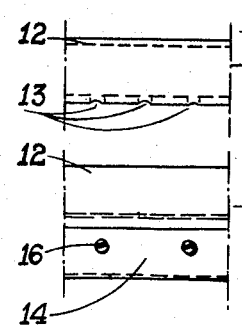
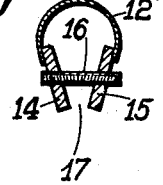
INVENTOR
EMILE PLUMAT
BY Corey, Hart + Stemple
ATTORNEYS — # United States Patent Office 3,192,025
Patented June 29, 1965

3,192,025
COOLING PROCESS AND DEVICE FOR THE DRAWING OF GLASS
Emile Plumat, Gilly, Belgium, assignor to Glaverbel Societe Anonyme, Brussels, Belgium, a company of Belgium
Filed Mar. 17, 1961, Ser. No. 96,495
9 Claims. (Cl. 65—83)

The devices habitually employed for cooling sheets of glass drawn by the Pittsburgh or Fourcault processes, or by the Libbey-Owens process generally consist of flat boxes or a group of metal tubes in which water circulates. These coolers possess the following disadvantages:

Their surfaces deteriorate with time as a result of the deposits which may form on them from volatile materials or else as a result of the corrosion of the constituent metal of their walls. These surface deteriorations modify locally the emissivity of the coolers and contribute to the deterioration of the surface quality of the glass which is no longer subjected to uniform cooling. Moreover, it may happen that the products of this corrosion fall on to the glass and impair its surface. Finally, having regard to the fact that the purification of the water circulating in the tubes or boxes forming the coolers is rarely perfect, encrusting deposits may form in the coolers, the consequences of these deposits being a local modification of the coefficient of heat transmission.

Moreover, the fact must be taken into account that the metal constituting the coolers has a relatively low emissivity which in any case varies with the state of its oxidation. It is well known that the majority of liquids such as water and numerous liquids, for example those indicated below, have a high absorbing power in the infra-red.

The present invention is based on the discovery that it is possible to improve the conditions of drawing glass and also the surface quality of the glass drawn by replacing the metal coolers situated on each side of the sheet being drawn, completely or partly by at least one sufficiently continuous and uniform liquid curtain.

The object of the invention therefore consists in general terms in a process and device for the cooling of a sheet of glass being drawn vertically in the drawing kiln of a glass tank furnace, characterised by the fact that the cooling is carried out by at least one liquid curtain exposed in relation to the sheet of glass and formed opposite each of the surfaces of this sheet in such a way as to extend in the direction of the width of this surface, over an appropriate length and at an appropriate distance from it.

The accompanying drawings represent diagrammatically and by way of example several variations of the device for carrying out the process which is the object of the invention, i.e.

FIGURE 1 represents a transverse section through the drawing chamber of a glass tank furnace provided with a cooling system according to the present invention;

FIGURE 2 represents a longitudinal section of a device according to FIGURE 1, including the circulation and cooling accessories;

FIGURES 3 and 4 represent a side view and a transverse section in a first example of a liquid distributing tube of a cooler according to the invention;

FIGURES 5 and 6 represent a side view and a transverse section of a second example of a liquid distributing tube of a cooler according to the invention;

Figure 7:
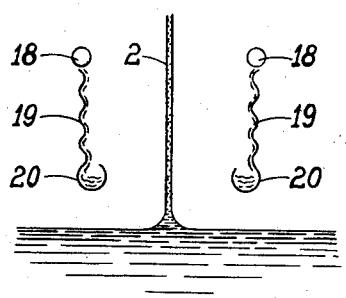
FIGURES 7 and 8 represent transverse sections of two other variations of coolers according to the invention.

In FIGURES 1 and 2 which represent a glass drawing system according to the Pittsburgh process, although the invention can be applied to other drawing systems, 1 designates the bath of glass, 2 the vertically drawn sheet, 6 the L-blocks defining the glass drawing kiln, 7 the draw bar and 8 the wall of the tank. The system of coolers which is the object of the invention comprises a tube 3 distributing the cooling liquid 4 in the form of a continuous curtain. This curtain of liquid is collected at its lower end by a gutter 5. From the latter the liquid flows towards the outside (see FIGURE 2), through a conduit 9 connected to a pump 10 which sends it into a cooling device 11 through which it is thus obliged to pass before re-entering the interior of the drawing machine through the tube 3 and being again distributed by the latter in the form of a curtain. In the cooling device 11 the liquid can be cooled either by a circulation of air or by counter-current circulation of liquid or by any other known process.

Different types of liquids can be used in the process which is the object of the invention.

Thus water can be used as can other liquids sufficiently fluid to flow uniformly, particularly liquids having a low vapour tension such as for example silicone oils, certain mineral oils such as paraffin oil, vegetable oils such as for example tripalmitine, trioleine and certain synthetic products such as biphenyl. This latter product is particularly suitable for use according to the invention because of its high boiling point (about 250° C.) and its resistance to deterioration.

The vapour tension of the liquid used can be reduced by dissolving a soluble body in it. In water one can dissolve certain metal salts such as sodium chloride. In other cases silicone oils can be put into solution in the liquid forming the curtain.

Moreover, according to the invention the absorbing power of the liquids used can be modified by the addition either of a colouring agent or of a colloidal suspension such as a colloidal suspension of carbon; the liquid is selected with regard to its viscosity in order to facilitate flow, its surface tension, its inflammability as low as possible, and its vapour tension which must be sufficiently low.

The surface tension can be decreased by means of additives in order to stabilise the liquid sheet. These additives can be for example anionic wetting agents such as salts of fatty acids; palmitate, stearate, oleate of sodium or potassium; cationic wetting agents such as for example sulphate of lauryltrimethylammonium; or non-ionic wetting agents such as polyglycol palmitate or polyglycol oleate.

The distribution of the cooling liquid according to the invention can be carried out in various ways. It can be executed for example by means of a simple metal tube 12 drilled with a row of apertures 13 separated by spaces of the required appropriate size which distribute the liquid in the form of a curtain over the whole width of the machine (see FIGURES 3 and 4). The apertures 13 are sufficiently close together to avoid discontinuities in the liquid curtain 4, it being possible for these discontinuities to have an undesirable influence on the surface quality of the glass. The distance between the apertures 13 can therefore be in relation to the distance separating each cooler from the sheet of glass. Moreover, the diameter, number and proximity of the apertures 13 is determined in relation to the feed of the liquid, its viscosity, its calorific and optical properties and feed pressure. The feed of the liquid can vary within fairly wide limits. These limits may lie for example between 5 and 30 litres per minute according to the physical properties of the liquids and the temperature desired. It is, however, well understood that one may deviate from these limits without departing from the scope of the invention.

A modification of the liquid distributor which is the subject of the invention is shown in FIGURES 5 and 6.

According to this manner of execution the liquid distributing tube 12 is conceived in such a manner as to allow the liquid to be distributed in the form of a perfectly continuous film. For this purpose it is made up of two metal sheets or lips 14, 15 the length of which corresponds to the region to be cooled. These two sheets 14, 15 are linked with each other at their lower part by a relatively thin and easily deformable sheet. This sheet can be of steel, stainless steel or resistant alloy.

These two sheets 14, 15 are linked with each other by separation screws 16 with opposite threads so that by acting on these screws the width of the opening 17 left by the said sheets can be regulated.

The process which is the object of the invention can be carried out in many ways substantially different from each other. Thus according to FIGURE 7 the distributing tubes 18 are mounted at the top of undulated plane sheets 19, forming with their lower part a collecting and returning gutter 20 so that the liquid leaving 18 comes down in the form of a uniform sheet over the surface 19 turned towards the sheet of glass 4 to be collected and evacuated at 20. The sheet of liquid thus formed must be continuous with the width of each sheet 19. This form of realisation of the invention has the advantage of ensuring a good control of the liquid which flows opposite the sheet of glass 4.

On the side opposite to the sheet of glass the metal will preferably have as low an absorbing power as possible, for example it will be chosen from the metals or alloys having a high reflecting power for infra-red radiations, thus limiting the heating of the film of liquid. The metals will be for example aluminum or titanium; the alloys will be for example a stainless steel or Monel metal, and also there may be used metal or alloy with a plating of nickel or chromium for example a plating obtained by electrolytic or chemical methods or by flame projection.

Figure 8:
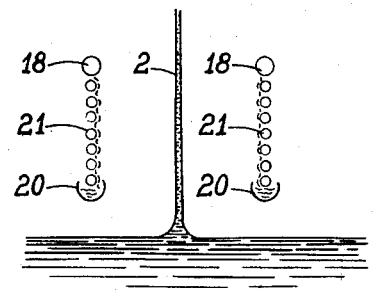

According to the modification of the invention shown in FIGURE 8, the sheets 19 are replaced by rows of super-imposed horizontal tubes 21 serving to some extent as steps for the flowing of the liquid coming down in the form of the uniform sheet to the gutter 20.

The process which is the object of the present invention offers very flexible functioning conditions because it allows the easy modification of the thermal exchange by adjusting the feed of liquid, the temperature of the liquid and the distance separating the distribution tubes from the gutter. Moreover, the modification of this distance can be regulated during operation.

The process described has also the advantage of allowing a more extensive choice of the temperature of the cold surface receiving the calorific radiation; particularly for one and the same temperature of the cooling liquid the absorption of heat is greater because it is no longer counteracted by the inter-position of the metal which can be rusted or encrusted.

Figure 9:
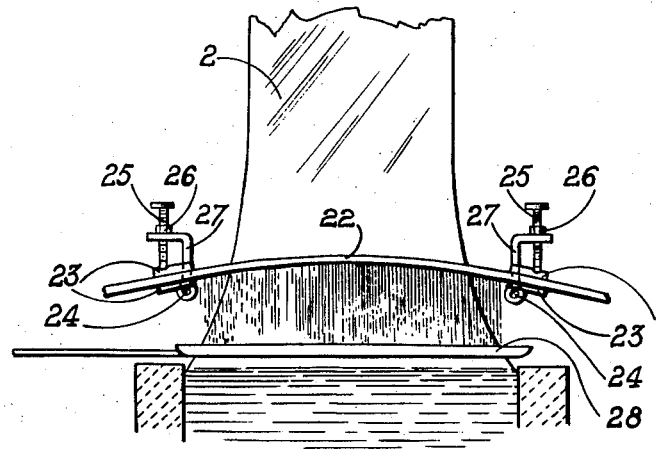
FIGURE 9 represents a deformable cooler according to the invention.

According to the present invention it is moreover possible to modify and adapt the thermal exchange by radiation not only in the direction of the width but also in the direction of the length of the sheet of glass being drawn. It is enough for this to give to the distributing tube 22 a shape appropriate for this purpose or to make it deformable or flexible or pliable so that it can be waisted according to an appropriate variable radius as shown in FIGURE 9. In this manner the thermal flow along the sheet of glass can be adjusted in relation to the cooling requirements. Moreover, in this manner it is possible to modify, during drawing, the longitudinal shape of the cooling tube 22 by mounting it for example in supports 23 angularly displaceable on fixed supporting axes 24 by means of regulating screws 25 capable of rotating in nuts 26 mounted on arms 27 fixed in a rigid manner to the respective axes 24. The distributing tube 22 thus acquires the desired shape.

Moreover, according to the invention it is also possible to give to the distributing tubes 22, a shape suitably curved transversely to the plane of the sheet of glass for example by mounting the axes 24 in their turn on axes for example horizontal ones (not shown) orientated at a right angle in relation to the axes 24. But in this case it is necessary for the gutters 28 to be sufficiently wide or deformable with corresponding distributor tubes so as to correspond to the horizontal curvature given to the distributing tube and therefore to the liquid curtain leaving the latter.

One very important advanage of the object of the present invention described above consists in the fact that in the case of utilisation of a liquid having a relatively high temperature and a very high absorbing power, the cooling of the sheet by radiation is favoured and the unfavourable influence of the convection currents of air is thus diminished.

Of course the invention is not limited to the form of execution which have been described and shown by way of example and modifications may be made to it without departing from its scope.

I claim:

1. The process of cooling a sheet of glass as it is being vertically drawn from a body of molten glass in the drawing kiln of a glass furnace, which comprises exposing at least one surface of the glass sheet to the direct cooling action of a liquid curtain which extends downwardly from a point above the surface level of the molten glass body for a substantial distance to a point short of such surface level, and which has one side thereof disposed in directly opposed, spaced relation across the portion of said glass sheet surface located adjacently to said molten glass body.

2. The process defined in claim 1 in which the liquid forming the liquid curtain is controlled to provide in its fall such liquid curtain with a given continuity and uniformity over a substantial portion of the area of the liquid curtain.

3. Apparatus for cooling a sheet of glass as it is being vertically drawn from a body of molten glass in the drawing kiln of a glass furnace, comprising liquid distributing means for forming a liquid curtain located a substantial distance above the surface level of the molten glass body and extending in given spaced relation across one side of the portion of the glass sheet located adjacently to the molten glass body, means for feeding to said distributing means liquid in sufficient quantity to form a liquid curtain having one side thereof disposed in directly opposed relation to said side of said glass sheet portion so that the latter is subjected to the direct cooling action of such liquid curtain, a liquid collector located a substantial distance below said distributing means and positioned above said level of the molten glass for collecting the liquid forming such liquid curtain, and means for removing the liquid collected by said liquid collector.

4. Apparatus such as defined in claim 3, in which said liquid distributing means comprises an apertured tubular member extending across the width of the glass sheet and constructed to direct the stream of liquid fed therethrough transversely downwardly towards said liquid collector in the form of a liquid curtain.

5. Apparatus such as defined in claim 3, including means associated with the other side of the liquid curtain for guiding the liquid in such curtain along a given path in its fall from said distributing means without obstructing such liquid curtain from said opposed side of the glass sheet portion.

6. Apparatus for cooling a sheet of glass as it is being vertically drawn from a body of molten glass in the drawing kiln of a glass furnace, comprising cooling means located above the surface level of the molten glass body on both sides of the glass sheet being drawn therefrom and including liquid distributing means located a substantial distance above such surface level and extending across the width of the glass sheet on both sides of such sheet and in given spaced relation to such sheet sides, for forming liquid curtains having one side thereof in directly opposed relation to both sides of the portion of the glass sheet located adjacently to the molten glass body so that the latter are subjected to the direct cooling action of such liquid curtains, means for feeding to said distributing means liquid in sufficient quantity to form such liquid curtains, liquid collecting means located a substantial distance below said distributing means and positioned above said surface level for collecting the liquid forming such liquid curtains, and means for removing the liquid collected by said collecting means.

7. Apparatus as defined in claim 4, in which the aperture in said tubular member extends across the width of the glass sheet to be cooled, and a pair of liquid discharge lips supported in depending relation on the edges of said tubular member forming such aperture and having a length approximating the width of the glass sheet to be cooled.

8. Apparatus as defined in claim 5, in which said guiding means comprises a vertically disposed member extending between said distributing means and said collector and having a width approximating the width of the glass sheet to be cooled, said member having an undulated surface over which flows the liquid forming the liquid curtain.

9. Apparatus as defined in claim 5, in which said guiding means comprises a vertically disposed series of superposed horizontal tubes extending between said distributing means and said collector so the liquid forming the liquid curtain flows over one side of such series of tubes, said tubes having a length approximating the width of the glass sheet to be cooled.

References Cited by the Examiner
UNITED STATES PATENTS

| Re. 14,794 | 1/20 | Colburn | 49—17 |
| 2,675,646 | 4/54 | Kramer et al. | 49—17 |
| 2,991,590 | 7/61 | Brichard | 49—17 |

FOREIGN PATENTS 224,931    5/58    Australia.

DONALL H. SYLVESTER, *Primary Examiner.*

UNITED STATES PATENT OFFICE
CERTIFICATE OF CORRECTION

Patent No. 3,192,025 June 29, 1965

Emile Plumat

It is hereby certified that error appears in the above numbered patent requiring correction and that the said Letters Patent should read as corrected below.

In the heading to the printed specification, between lines 7 and 8, insert the following:

>    Claims priority, application Belgium, Mar. 25, 1960,
>    467,659

Column 4, line 15, for "advanage" read -- advantage --.

Signed and sealed this 12th day of April 1966.

(SEAL)
Attest:

ERNEST W. SWIDER
Attesting Officer

EDWARD J. BRENNER
Commissioner of Patents